United States Patent

[11] 3,630,645

[72] Inventor Gunther Eheim
 Plochinger Str. 32, 7301 Deizisau,
 Germany
[21] Appl. No. 14,529
[22] Filed Feb. 26, 1970
[45] Patented Dec. 28, 1971
[32] Priority Oct. 17, 1969
[33] Germany
[31] P 19 52 352.5

[54] ENCAPSULATED ROTATABLE ELECTRIC MOTOR AND ROTATABLE FLUID PUMP ASSEMBLY
6 Claims, 3 Drawing Figs.
[52] U.S. Cl................................................. 417/420,
 417/367, 310/104, 285/331
[51] Int. Cl....................................................F04b 17/00,
 F04b 35/00, F04b 39/06
[50] Field of Search........................................ 471/420,
 367, 360, 357; 310/104, 87; 285/331

[56] References Cited
UNITED STATES PATENTS
3,198,125 8/1965 Yuza et al..................... 417/420
2,962,612 11/1960 Lung............................. 310/87
2,284,216 5/1942 Kunkel.......................... 285/331
2,951,447 9/1960 Casassa......................... 417/420
3,411,450 11/1968 Clifton.......................... 417/420

Primary Examiner—Robert M. Walker
Attorney—Flynn & Frishauf

ABSTRACT: To provide a totally oil-immersed motor for drive communication with a pump in a unitary assembly, an oil tight motor housing is separated from the pump housing by a thin, end wall to provide for heat exchange between the oil and the pumped fluid; the end wall is preferably of nonmagnetic, high-electrical resistance material, to permit a magnetic coupling to be used from the motor shaft to the pump impeller, the high-electrical resistance minimizing eddy current losses (such as some stainless steels). To facilitate assembly, the motor housing is preferably cylindrical for insertion of the motor therein as one unit, the pump housing with the common end wall being fitted on the cylindrical motor housing by means of an interengaging matching circumferential tongue and groove connection with an "O" ring as a seal, the parts being held together for example by screws.

ENCAPSULATED ROTATABLE ELECTRIC MOTOR AND ROTATABLE FLUID PUMP ASSEMBLY

The present invention relates to a pump-motor assembly, having a rotating electrical motor to drive a pump impeller, the motor being oil cooled.

Small motor driven pumps, such as are used to provide water circulation for large aquariums, display fountains and the like, and having a fractional horsepower motor, for example of the shaded pole-type, frequently run hot, so that small motors may require additional cooling beyond that available from the ordinary fan used with such motors. Electric motors to be used with water pumps, and particularly when they are to be used outdoors, require complete encapsulation, thus interfering with efficient air draft cooling. Large electric motors which are to be encapsulated may, of course, be provided with a forced oil cooling and oil heat exchange units; such arrangements are frequently however far too complicated and expensive for use with fractional horsepower motors designed for outdoor use; nevertheless, completely encapsulating such small motors severely limits their power output due to undesirable heating.

It is an object of the present invention to provide a pump-motor assembly suitable for outdoor use, in which the motor is totally enclosed and encapsulated which is of low cost and yet provides adequate power output by being properly cooled.

Subject matter of the present invention:

Briefly, the motor is retained in a completely closed, oil tight housing, preferably made of plastic material, which is so formed that one wall of the housing is of a heat conductive material which forms at the other side a portion of the pump chamber so that the liquid to be pumped will be in contact with that other side of the wall, to effect heat exchange between the oil in which the motor is retained and the fluid which is to be pumped.

By filling the motor housing with oil, insulation problems are avoided; additionally, modern insulating oils have a good heat transfer when contacting the heat conductive wall of the housing, the heat generated by the motor being constantly removed by the fluid being pumped and contacting the other thin wall of the housing. Thus, the motor is cooled by the pump fluid itself while still being completely sealed against ambient influences.

In order to completely seal the motor into a housing, the connection between the pump impeller and the electric motor is preferably a magnetic coupling; if such a magnetic coupling is used, then the common wall is preferably a material having high-electrical resistance while being essentially magnetically unaffected. Such a material is, for example, type V2A steel. The high-electrical resistance is desirable to decrease any eddy currents induced therein, which may cause undesirable losses and additional generation of heat.

A particularly simple assembly is obtained by forming the pump chamber unit as a removable cover for a common housing so that the entire pump assembly can be removed from the motor housing to provide access thereto. All housing parts can be made of plastic, and the heat conductive wall can be directly molded thereinto.

If the outside, ambient temperature conditions under which the motor is to operate are subject to wide variation, so that the oil filling for the motor may undergo wide temperature swings, then the housing preferably is formed with a moveable wall portion, such as a membrane, to prevent excessive oil pressure within the interior of the motor housing, which might cause leakage at the junction between the motor housing and the pump chamber assembly. A simple connection between pump chamber assembly and motor housing is the formation of a circumferential tongue and groove joint, having individually tapering parts, with an 0 sealing ring therebetween, the parts being held together by axially extending screws.

The invention will be described by way of example with reference to the accompanying drawings, wherein.

Figure 1:
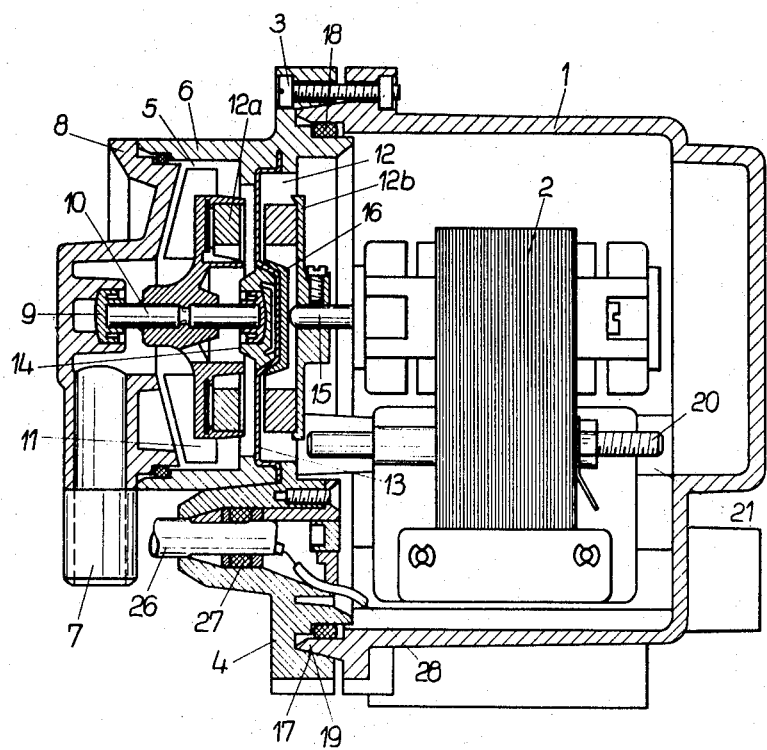
FIG. 1 is an axial sectional view of the motor-pump assembly.

An oil-proof, plastic housing 1 has an electric rotating motor 2 located therein. Housing 1 is filled with a suitable insulation and cooling oil. Housing 1 is closed off by a cover 4, secured thereto by means of screws 3. Cover 4 at the same time forms the molding 6 for the pump chamber 5. The pump housing molding 6 is closed off by a cover 8 having an inlet stub 7. Cover 8 also carries the bearing 9 for impeller shaft 10. Impeller shaft 10 has an impeller 11 secured thereto which rotates within pump chamber 5 and is coupled by means of a magnetic coupling 12 with the motor. Magnetic coupling 12 has a pair of coupling parts 12a, 12b, which preferably are coaxially arranged polarized ring magnets, the relative sectors of which are differentially magnetized. Magnetic coupling part 12b is secured to motor shaft 15.

A thin wall 13 is secured in the housing cover 4, extending between the coupling portions 12a, 12b. The thin wall 12 is formed of a heat conductive, essentially nonmagnetic material of high-electrical resistance, for example V2A steel. The thin wall 13, at the one side, closes off the oiltight motor housing; on the other side, the thin wall 13 defines pump chamber 5. Thus, heat from the motor transmitted to the oil filling within the motor chamber is applied to the thin wall 13 which, at the other side, is in contact with the fluid to be pumped through the pump chamber. Wall 13 additionally carries a bearing 14 for the pump impeller shaft 10. In order to compensate for axial loading of the bearing, the motor shaft 15 itself bears against a side of the thin wall 13, for example over a pressure plate 16, so that axial force components due to the magnets of the magnetic coupling 12 are compensated, and not transmitted to the thin wall 13, to cause deflection thereof.

The cover 4 and the motor housing 1 are interconnected by a circumferential tongue and groove connection. Cover 4 is formed with an open groove 17 which matches a projection 19 on the housing wall 1. An O-ring 18 seals the tongue and groove together. The groove 17, and the tongue 19, both extending circumferentially, have a wedge shaped cross section to pinch the O-ring 18 and are so arranged that plastic material cannot deform, even under stress. Screws 3 interconnect the housing 1 and cover 4.

Motor 2 is secured within the motor housing by a pair of bolts 20 which, in turn, are secured in suitable moldings in the cover 4, or in the housing 1, respectively, by intermediate resilient plugs 21, for example of oil-resistant rubber, plastics, or the like.

Housing 1 (see FIG. 2) may have a moveable wall portion, such as a rubber or plastic membrane 22 which is secured thereto at the edges 23 and has a protective cover 25 formed with air communication holes. Such a moveable portion prevents stress on the plastic housing upon temperature change of the oil.

The arrangement in accordance with FIG. 1 has a front electrical connection; a molded table 26, with a strain-relieving collar 27 is connected at the side adjacent the pump. The interconnection, schematically shown at 28, between the inlet cable and the motor wires is preferably over contact pins having a wiping contact action upon insertion of the motor.

Figure 2:
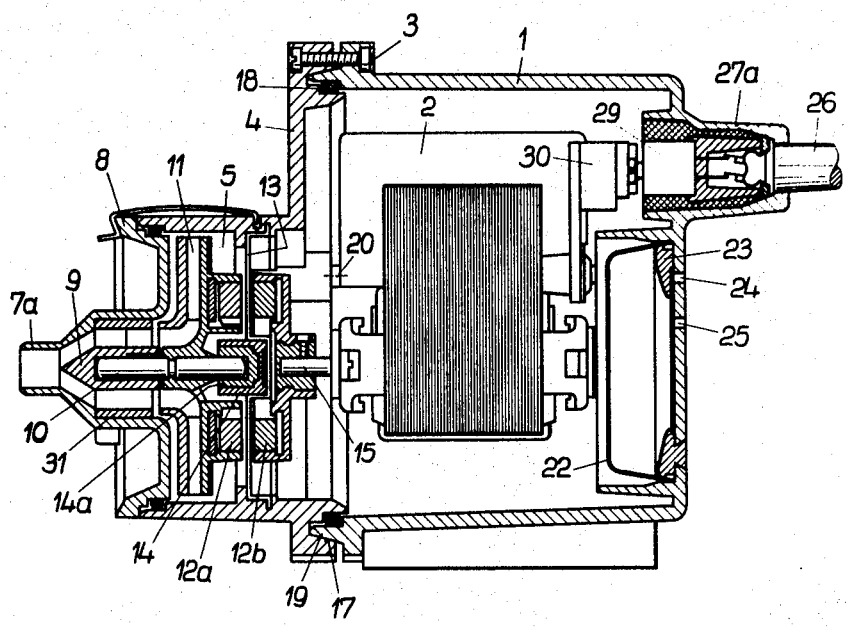
FIG. 2 is an axial sectional view of a different embodiment of the motor-pump assembly.
Figure 3:
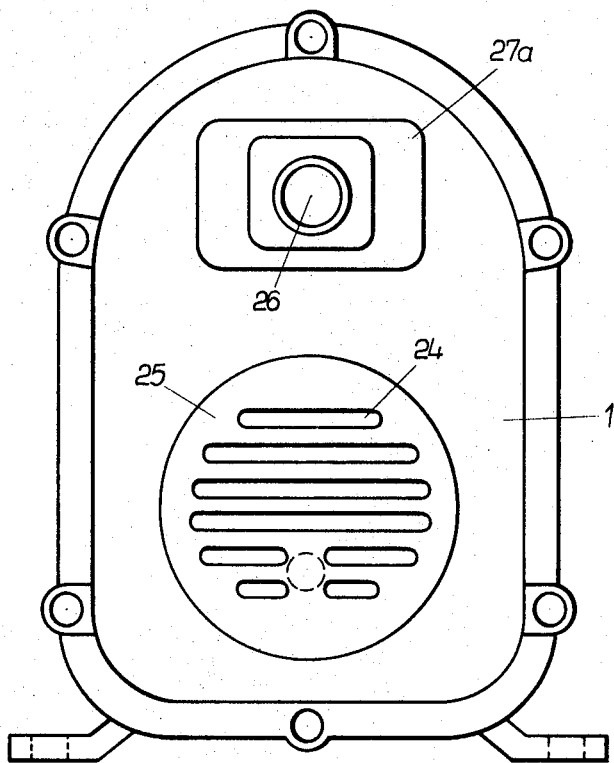
FIG. 3 is a rear view of the motor pump assembly in elevation.

FIG. 2 illustrates a cable connection in which the cable is introduced at the end remote from the pump. An entrance cable 26 is introduced to the motor housing at a cable inlet 27a, and connected to a plug connection 29. The motor 2 itself has matching contacts 30 fitting the plug connection. Upon assembly, cable 26 and its connecting plug is molded into the housing; the motor is then inserted into the housing from the pump end, with the plug connections making contact upon seating of the motor in the housing, thus avoiding any intricate soldering operations. Thereafter, that is upon assembling the pump assembly and cover 4 by means of screws 3, the entire pump motor is completely assembled together.

The inlet stub 7 of the pump cover has a right-angle bend as seen in FIG. 1. The inlet stub 7a in accordance with FIG. 2 is coaxial with the impeller shaft 10. The impeller shaft 10 itself is held in bearing 9 which is secured by means of a spider 31 in housing cover 8. The bearing 14, preferably, is formed of two parts and has a replaceable bearing bushing 14a (FIG. 2).

Various changes and modifications, as determined by power and fluid requirements may be made without departing from the inventive concept.

I claim:

1. Encapsulated rotating motor and rotating fluid pump combination assembly comprising
    an oiltight motor housing (1) forming a motor retaining chamber;
    a pump housing having a pump chamber (5) formed therein and located coaxial with said motor housing;
    a rotating impeller (11) located in said pump chamber;
    a thin, separating end partition membrane (13) of highly heat conductive, high-electrical resistance material secured to one of said housings and located to separate said motor chamber and said pump chamber (5) from each other;
    oil filling said motor chamber and being in contact with one side of said common end partition membrane, the fluid being pumped, when in the pump chamber, contacting the other side of said common end partition membrane to cool the oil filling said motor chamber and contacting said common end wall by heat exchange through said common end wall;
    and a magnetic coupling (12) having a magnetic part (12b) driven by said motor in said motor housing and located adjacent said one side of the common end partition membrane, and another part (12a) connected to said impeller and located adjacent said other side of said end partition membrane.

2. Assembly according to claim 1 wherein said pump housing forming said pump chamber is a unitary assembly secured to said motor housing.

3. Assembly according to claim 1 including a moveable element (22) forming part of the wall of said motor housing.

4. Assembly according to claim 3 wherein said moveable element is a membrane.

5. Assembly according to claim 1 wherein said housings have end faces in matching engagement, the end face of one of said housings being formed with a groove (17) having a cylindrical wall and the end face of the other with a matching projection (19);
    an O-ring (18) sealing said projection into said groove;
    and means (3) securing said housings together.

6. Assembly according to claim 5 wherein said projection and groove have a wedge-shaped cross section.

* * * * *